United States Patent [19]

Chevion

[11] Patent Number: 5,828,736
[45] Date of Patent: Oct. 27, 1998

[54] VOICE RECORDING AND PLAYBACK APPARATUS

[75] Inventor: Dan Shmuel Chevion, Haifa, Israel

[73] Assignee: International Business Machines Corporation, Armonk, N.Y.

[21] Appl. No.: 654,369

[22] Filed: May 30, 1996

[30] Foreign Application Priority Data

May 30, 1995 [GB] United Kingdom ............... 9510879

[51] Int. Cl.⁶ ............................................. H04M 11/00
[52] U.S. Cl. ............................ 379/100.13; 379/88.14; 379/100.02
[58] Field of Search .................. 379/100.01, 100.13, 379/100.14, 100.02, 110.01, 88, 89, 88.13, 88.14

[56] References Cited

U.S. PATENT DOCUMENTS

| | | |
|---|---|---|
| 3,776,454 | 12/1973 | Jones . |
| 4,286,146 | 8/1981 | Uno . |
| 4,654,875 | 3/1987 | Srihari et al. ............. 382/40 |
| 5,091,931 | 2/1992 | Milewski ................ 379/100 |

FOREIGN PATENT DOCUMENTS

| | | | |
|---|---|---|---|
| 0388204 | 9/1990 | European Pat. Off. ....... | G05K 19/00 |
| 0544016 | 6/1993 | European Pat. Off. ....... | H04M 1/272 |
| 0586954 | 3/1994 | European Pat. Off. ......... | H04M 3/50 |

OTHER PUBLICATIONS

Patent Abstracts of Japan, vol. 13, No. 117 (E–731), Mar. 22, 1989.

Patent Abstracts of Japan, vol. 11, No. 190 (E–517), Jun. 18, 1987.

International Search Report, International Application No. PCT/GB95/02553, G. Forlen, Feb. 19, 1996.

*Primary Examiner*—Stella Woo
*Attorney, Agent, or Firm*—Jeanine S. Ray-Yarletts

[57] ABSTRACT

Recording apparatus is disclosed adapted for connection to a telephone network and to receive voice signals therefrom characterized by an encoder for converting voice signals received from the telephone network into an optically readable image using a predefined code and a printer for printing the optically readable image. Also provided is playback apparatus comprising an optical scanner for producing a digital representation of a document on which is printed an optically readable image, a decoder for converting the optically readable image into audio signals using a predefined code and a transducer for producing a sound corresponding to the audio signals. The recording apparatus and the playback apparatus can be integrated into a single apparatus. In a preferred form of the invention, a device is provided which is adapted for connection to a conventional fax machine to form such recording or playback apparatus in conjunction therewith.

16 Claims, 4 Drawing Sheets

VOICE RECORDING AND PLAYBACK APPARATUS

TECHNICAL FIELD

This invention relates to the recording of voice signals received from a telephone network and the playback of such recorded signals.

BACKGROUND ART

Traditionally, the primary use of the telephone network has been the transmission of signals representing the sound of the human voice. A wide variety of devices have been developed for recording audio signals received over a telephone network. These include conventional analogue or digital answering machines and computerized voice response units arranged to store the signals in digital form in a computer memory.

More recently, the telephone network has been used by fax machines to transmit signals representing encoded image data. A conventional fax machine receives such signals, decodes the signals and prints the image on paper. Usually the image data is generated by scanning a printed document, although it is common nowadays for the image data to be generated within a computer and transmitted directly from computer memory.

However, conventional voice and fax communications over the telephone network are incompatible in the sense that the two types of data are entirely different and cannot normally be combined in the same transmission, nor can a conventional fax machine be used to record a voice communication.

On the other hand, it is known to record digital data on paper using optically readable codes and several such codes have been developed. One such code is formed as a checker board symbol that represents information in the form of black and white squares. Each square obtained within the checker board matrix is of equal size to every other square. Another code, disclosed in U.S. Pat. No. 3,763,467, is intended to provide the capability to expand or contract data capacity to meet changing user requirements by providing indicia associated with the code to inform the computer of the size of the code.

GB-A-2218240 discloses a dynamically variable machine readable binary code which includes indicia indicating the amount of data included in the code as part of the character itself, and it is intended to solve density and size problems found in other codes.

Also well known is technology for the machine reading of normal printed text, generally referred to as Optical Character Recognition (OCR).

DISCLOSURE OF THE INVENTION

In general terms, the object of the present invention is to enable the telephone network to be used in a more flexible manner to transmit, receive and record voice messages.

To achieve this object, the present invention provides recording apparatus adapted for connection to a telephone network and to receive voice signals therefrom characterised by an encoder for converting voice signals received from the telephone network into an optically readable image using a predefined code and a printer for printing the optically readable image.

Also provided is playback apparatus comprising an optical scanner for producing a digital representation of a document on which is printed an optically readable image, a decoder for converting the optically readable image into audio signals using a predefined code and a transducer for producing a sound corresponding to the audio signals.

Conveniently, the recording apparatus and the playback apparatus can be integrated into a single apparatus.

In a preferred form of the invention, a device is provided which is adapted for connection to a conventional fax machine to form such recording or playback apparatus in conjunction therewith.

The idea of recording digital data on paper using machine readable codes is not new and several such codes have been developed. Examples can be found in GB-A-2218240 and EP-A-598357. However, it has not heretofore been suggested to use such codes to record voice data received from a telephone line, nor have the advantages that such a recording device provide been realised.

For example, voice messages can be treated just like documents, they can be archived or moved from person to person.

Moreover, any fax machine can be made available to receive and record telephone calls just like an answering machine. This provides a new kind of answering machine which records a voice message on paper. This has significant advantages in terms of the editing and storage of messages.

In addition, this approach enables voice data to be added to faxed documents, for example to provide annotations or illustrate aspects, such as intonation, which would not be apparent from the mere appearance of the printed document.

In preferred embodiments, an improved optically readable code is employed which is particularly suitable to be printed by fax machines and read by fax machines and which improves the density with which data is recorded while maintaining at a low and constant level the error rate due to noise added to the signal by printing or scanning and by the rotation of the paper.

The optically readable code is adapted to be read by an optical scanner which includes a row of detectors. The code has a character set in which each character in the set corresponds to a predefined bit sequence in digital data to be encoded, the pixels making up each character are contiguous, each character contains no holes and the dimension of each character is greater in the direction perpendicular to the row of detectors than in the direction parallel to the row of detectors.

To cope with the problems listed above a code has been devised in which every aspect of the problem can be handled separately, that is modularity is part of the solution. Compression problems, or error correction problems are not solved in heuristic fashion as is found in the prior art. A general purpose code has been devised which allows well established compression and error recovery techniques to be employed in a very natural and effective way.

Paper, unlike magnetic storage or semiconductor memory, does not have coordinates attached to it in a natural way. Therefore, it does not have a simple and exact way to introduce the concept of memory cells or addresses. The 'Checker Board' method found in the prior art is an approach that tries to impose cells of very small dimension and area as containers for bits. This approach has disadvantages because paper very poorly memorizes locations with fine resolution as is required for high density data storage.

The inventors approach is, therefore, to use characters arranged in lines written in a sequence. The size of a symbol is chosen to be big enough so that addresses are introduced naturally in lines and location in the line. Characters of approximately 15×15 pixels are large enough to enable the lines constructed by such characters and the location of the characters within each line to be found via registration techniques used for optical character reading (OCR). In conventional OCR the characters are usually bigger and the number of different characters smaller.

This approach enables rotation errors to be overcome easily by following the well defined lines by moving from one character to the next one. The location of the next character in the sequence can be accurately predicted from a previous character up to an accuracy of one or two pixels.

The choice of the character set itself is driven by the nature of the noise added to characters. It was found by experiment and then explained theoretically that in fax transmission noise does not have the nature of salt and pepper, rather it has the nature of a quantization effect—not quantization of the radiometric level of blackness on the paper, but quantization of the pixel location. In other words, the location of a pixel is not predictable to the extent of one or two pixels.

This has been found to impose a special character on noise on the characters. A character may change its appearance only on its contour. For this reason characters are chosen that have small contours.

Preferably, therefore, each character comprises a series of rectangles spaced in a direction perpendicular to the row of detectors, wherein the width and/or position in a direction parallel to the row of detectors of each rectangle is determined by a bit pair in the bit sequence to be encoded by the character.

Choice of characters with the aforementioned nature means that shape can be recognized independently of the exact location of every pixel. Two characters that have the same shape are the same character even if the location of their pixels is slightly different.

A second reason for choosing contiguous character sets is the requirement to compress the image efficiently. The RL and MMR compression techniques used in conventional fax transmission tend to compress better if there are less transitions from black to white and vice-versa.

Moreover, scaling up and down a character set as described above can be done by using the same methods used successfully in the well known PostScript print formatting language—that is by encoding the characters using their spline contour description.

In a preferred embodiment, the bit sequence corresponding to each character includes an error correcting code.

By incorporating error correcting codes in the construction of the character set an improved density can be achieved and a character can be recognized by using a function relating the pixel values to their interpretation, rather than using a time consuming matching process between the current character and all possible characters in the character set.

To assist in registration, each character preferably includes a portion which is common to all characters.

BRIEF DESCRIPTION OF DRAWINGS

An embodiment of the invention will now be described, by way of example only, with reference to the accompanying drawings, wherein.

BEST MODE FOR CARRYING OUT THE INVENTION

Figure 1:
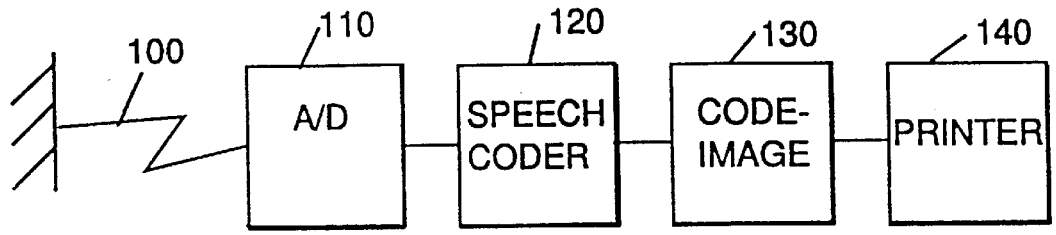
FIG. 1 shows a data recording device.

Reference is first made to FIG. 1, which shows in schematic form the main components of a recording apparatus for recording voice signals on paper using a machine readable code. The apparatus comprises a suitable interface for connection 100 to telephone network, an analog to digital converter 110 for converting analog signals received from the network into digital format, for example using conventional A-law or mu-law amplitude encoding with a 8K bytes/s sampling rate. Speech coder 120 encodes the digital samples into a compressed form using a suitable data compression algorithm of which there are many known types. In this embodiment, the voice data are arranged in frames each of which is compressed separately to ensure that even if there was an error in the decoding, this error would not continue to the end of the message, but will stop at the end of the frame.

In addition, conventional burst error correction coding techniques may be used to prevent an entire character being lost.

The output of speech coder 120 is a stream of digital data to be recorded onto paper.

It will be appreciated that in other embodiments the voice data received from the telephone network may already be in digital format, in which case A-D converter 110 would not be required.

A significant aspect of the present apparatus is code-to-image converter 130 which converts the compressed digital data steam symbol-by-symbol into a bit map form for printing. This element will be described in more detail below.

The apparatus also comprises a printer 140, which may be any suitable printing module, such as a thermal, ink-jet or xerographic printing module, capable of printing a high resolution bit-map image, preferably of at least 200 dpi resolution. Printer 140 is arranged to receive from the code-image converter 130 and print a bit-map representing voice data received from the telephone network over connection 100.

Figure 2:
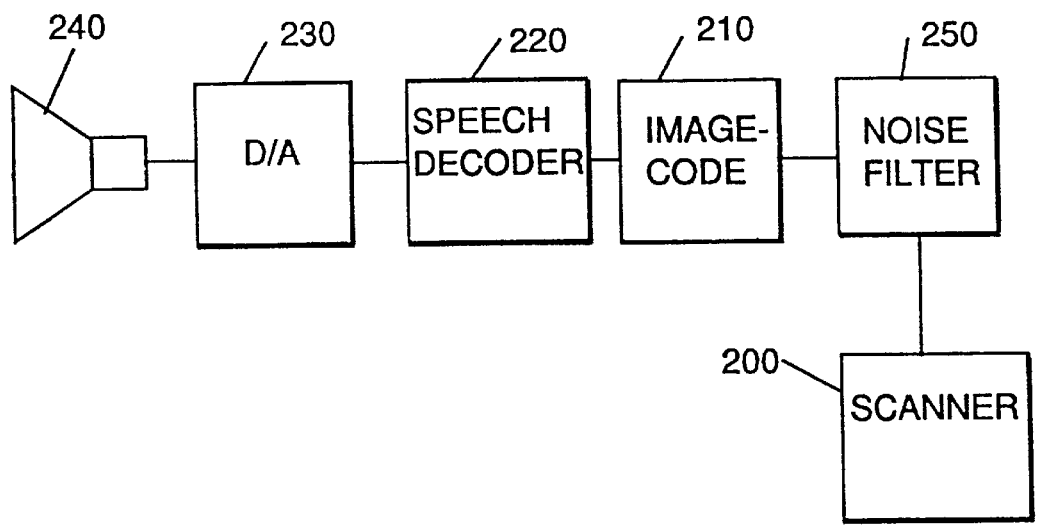
FIG. 2 shows a playback device.

FIG. 2 shows in schematic form the main components of playback apparatus for playing back voice signals recorded on paper using the apparatus of FIG. 1.

The apparatus comprises an optical scanner 200 for generating digital data representing an image printed on the face of a document. Such scanners are well known and conventionally operate by measuring the intensity of light reflected from the surface of the document. A picture element or pixel is determined by the small spot of the image that covers one photosensor. A conventional Group 3 fax machine employs a stationary strip of 1728 photosensors, one for each pixel across the page. The scanner reads sequentially, as one scanning line, all of the 1728 picture elements across the width of the page. A stepper motor moves the page down in order for the next strip to be read.

The digital data representing the image is then passed to an image-to-code converter 210, which decodes the image to recognize therein a sequence of symbols. This recognition process will be described in more detail below.

As an optional feature a noise filter 250 may be included in the system in order to preprocess the images received from scanner 200 in order to remove or modify certain image features which can be recognised as being artifacts, using empirically determined rules.

As described above, the symbols represent a compressed form of digital data which in turn represents sampled voice data. The compressed digital data is decompressed by speech decoder 220 and passed to digital to analogue converter 230. D-A converter 230 generates an analogue signal which is output by loudspeaker 240.

Figure 3:
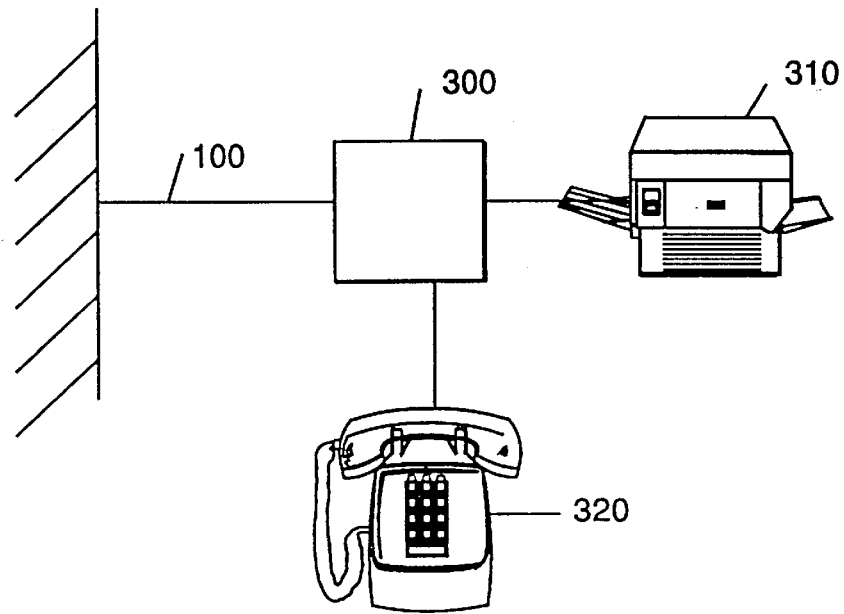
FIG. 3 shows a device for use with a fax machine and a telephone.

FIG. 3 illustrates a preferred form of the invention in the form of an add-on device 300 for use with a conventional fax machine and telephone. The device comprises a connection 100 to a telephone network and is suitably adapted for connection to a fax machine 310 and conventional telephone 320. It will be appreciated that the device might also comprise a suitable interface to a computer (not shown).

In this device the function of the printer 140 and scanner 200 are performed by the fax machine, whilst the function of the speaker 240 is performed by telephone 320. Of course, the device 300 also has a 'transparent mode' in which either fax machine 310 or telephone 320 may be used in conventional fashion.

Figure 4:
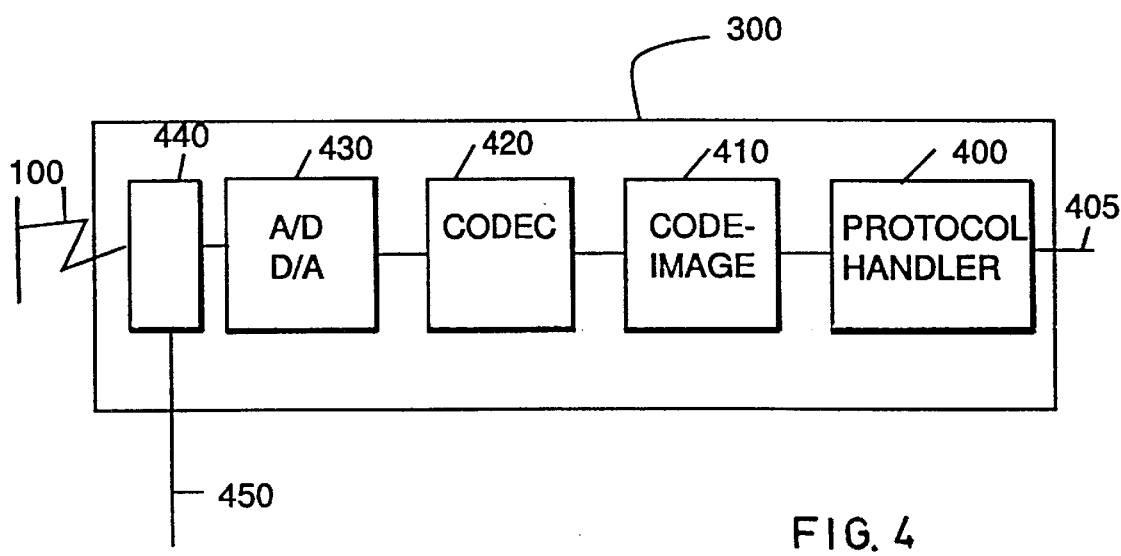
FIG. 4 is a more detailed schematic diagram showing the device of FIG. 3.

FIG. 4 is a schematic diagram showing the device of FIG. 3 in more detail.

The device comprises a protocol handler 400 for managing the communications with fax machine 310. This device encodes the bit map generated by code-to-image converter 410 and communicates it to the fax machine 310 over connection 405 using one of the well known standard fax communications protocols, such as G3 or G4.

Code-image converter 410 handles the conversion of the compressed voice data into bit-map form and vice versa, as described in more detail below. The device also comprises codec 420 for compressing and decompressing the voice data, D-A and A-D converter, indicated generally at 430, and a switch 440. The device also includes conventional call answering logic 440 which will answer an incoming call over connection 100 and, if appropriate, play a welcome message to the caller to indicate that their input will be recorded. Call answering logic 440 also incorporates a switch which enables the device to be configured either to receive and record incoming calls over connection 100, to output recorded data over connection 450 to a conventional telephone or to operate in 'transparent mode' allowing either the telephone connected on line 450 or the fax machine to operate normally.

To facilitate the reading and writing of digital data on paper with a low error rate, and with high density, under real fax scanner and printer constraints, a new machine readable code has been developed which is particularly suitable for this application.

Reading and writing can be assumed to be a Binary Symmetric Channel (BSC). A Maximum Likelihood Decoding (MLD) scheme is used. Decoding of a code word C when received as R that the probability P{R|C} must be maximized, which is equivalent to finding the nearest neighbor in terms of Hamming distance, ie the character which differs at the minimum number of bit positions.

Figure 5:
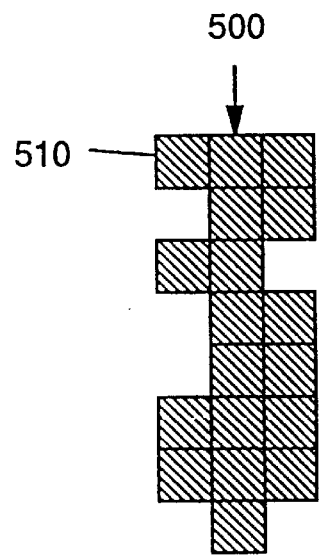
FIG. 5 shows a single character in a machine readable code.
Figure 6:
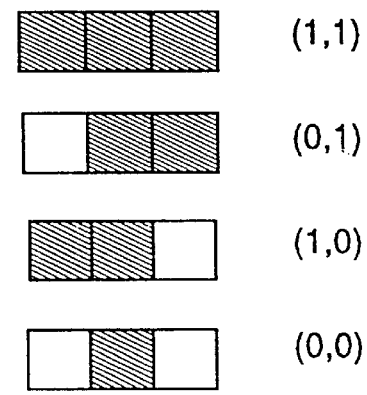
FIG. 6 shows rectangles making up a character in the machine readable code.

Therefore a character set has been defined which includes a total of 2048 characters, each corresponding to a particular 11-bit combination, with a minimum Hamming distance between each character of 4 and which incorporates an error correcting code capable of recovering one error. An example of one character is shown in FIG. 5. Each square on FIG. 5 represents a block of 2×2 pixels. The character is built up of eight horizontal rectangles of dimension 6×2 pixels which are used to encode a 16-bit word made up of 11 data bits and 4 extra bits for the error correcting code, using the four possible states of the rectangle to encode corresponding bit pairs as shown in FIG. 6. As before, each square on FIG. 6 represents a block of 2×2 pixels. Using this scheme the character shown in FIG. 5 represents the 16-bit word (1,1, 0,1,1,0,0,1,0,1,1,1,1,1,0,0).

Figure 7:
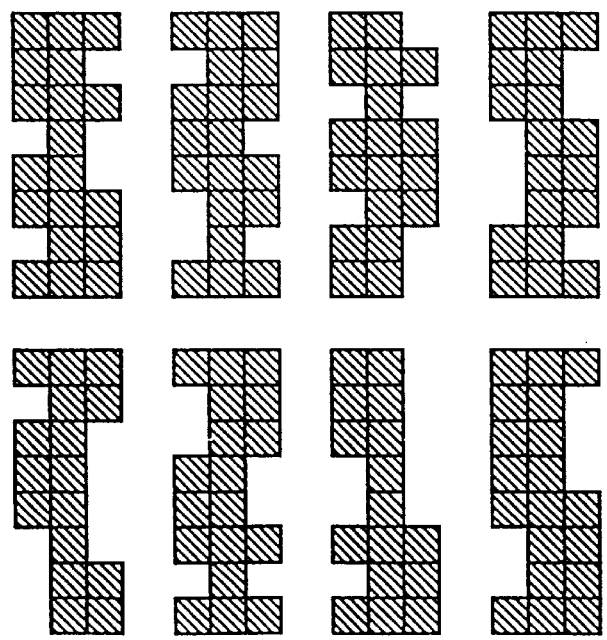
FIG. 7 shows a portion of a printed image including several characters in the machine readable code.

In this embodiment, the horizontal dimension of each character is 6 pixels and the vertical dimension is 16 pixels, ie each rectangle has dimensions 6 pixels×2 pixels. The characters are printed with a spacing of 3 pixels all around them. An enlarged example of a portion of the printed code is shown in FIG. 7. As before, each square on FIG. 7 represents a block of 2×2 pixels. At 200 dpi resolution, this gives rise to a data density of 2573 bits per square inch.

It will be observed that using this scheme, the elements in the central column of the character, indicated at 500 in FIG. 5 and the element 510 in the top left hand corner of the character are black in all characters in the set. These features may therefore be used to locate the characters in the reading process. In other embodiments, the central column 500 need not be of the same width as the other columns making up the character, but its presence is important so that pixels making up the symbol will be contiguous and therefore compressible with MMR and to assist in registration as described below.

This code has the features that the pixels making up the symbols are contiguous (ie the symbols are one-piece), the symbols have no holes and their vertical dimension is longer than the horizontal.

These features have been found in a study conducted by the inventors to reduce the influence of noise and to define a pattern which is better compressed using the RL and MMR fax compression schemes. This latter point is of significance since the image will be encoded as fax data in transmission between device 300 and fax machine 310 as shown in FIG. 3.

In particular, it has been observed that there is a correlation between noise and signal and that noise usually occurs on the margins of the characters. There is rarely an isolated noise element. Sometimes noise reduces the signal, and sometimes it causes widening of it. Furthermore, noise has been found not to be isotropic, the preferred direction is the vertical one. It has also been found that noise is never larger than 2 pixels in the same direction and that in addition to the radiometric noise there is also a geometric noise which causes local variations.

It has been examined whether noise is introduced while the document is printed or while it is scanned and it has been found that the printer does not introduce noise at all. So it was concluded that noise is not introduced by communication or printing and therefore must arise in the scanner and it is thought that most noise arises as a result of quantization in the scanner. Indeed, all the observations detailed above are consistent with this assumption.

According to the relative displacement between the dots and the line scanner there are several possibilities. Pixels may move half a step in any direction, a single pixel might disappear and if the pixel is at the end of a row it might be doubled.

In addition, a row is produced by many cells in the scanner while a column is produced by a single cell at different times. Therefore, an error affecting one pixel in a column tends to affect all pixels in the column, whilst in a row each pixel acts independently. This means that the noise is anisotropic.

It was therefore concluded that contiguous symbols are more immune from noise, that it is not recommended to have small holes in symbols and that it is preferable to use long symbols rather than wide symbols, because of the preferred vertical line.

Within the 16-bit word represented by each character, a systematic error correcting code is used. 11 elements of the character are used for 11 bits of data, 4 elements are used for error correction and one element is used for registration.

In particular, elements 5 to 15 are used for the data, each element representing one bit and elements 1 to 4 are used for error correction. Element 16 is always equal to 1 and is used for registration.

An element is represented by its number. The content of each element is a binary digit and the sum is the Boolean addition. To encode 11 data bits (elements 5–15) the following equations are used:

I. 1=15+14+13+12+10+8+6

II. 2=15+14+13+11+10+7+5

III. 3=15+14+12+11+9+8+5

IV. 4=15+13+12+11+9+7+6

To decode the error correcting code, the sum of the left and right hand sides of the equations above are calculated from the read character to obtain four binary digits. From these four digits, a number is constructed with four digits where equation I represents the most significant digit and equation IV represents the least significant one. This number is used to identify errors in the character, if any. It is referred to as the syndrome.

The following Look Up Table is used for error correction:

| SYNDROME | ELEMENT TO BE INVERTED |
| --- | --- |
| 0 | NO ERROR |
| 1 | 4 |
| 2 | 3 |
| 3 | 9 |
| 4 | 2 |
| 5 | 7 |
| 6 | 5 |
| 7 | 11 |
| 8 | 1 |
| 9 | 10 |
| 10 | 8 |
| 11 | 12 |
| 12 | 10 |
| 13 | 13 |
| 14 | 14 |
| 15 | 15 |

Conventional OCR programs generally try to find the best match between a current character to be recognized and the whole of the character set. This approach, however, is expensive in terms of computer resources and therefore a different approach has been developed. The new approach employs recognition according to a rule. It makes the recognition quicker and cheaper both for hardware and software implementation.

Figure 8:
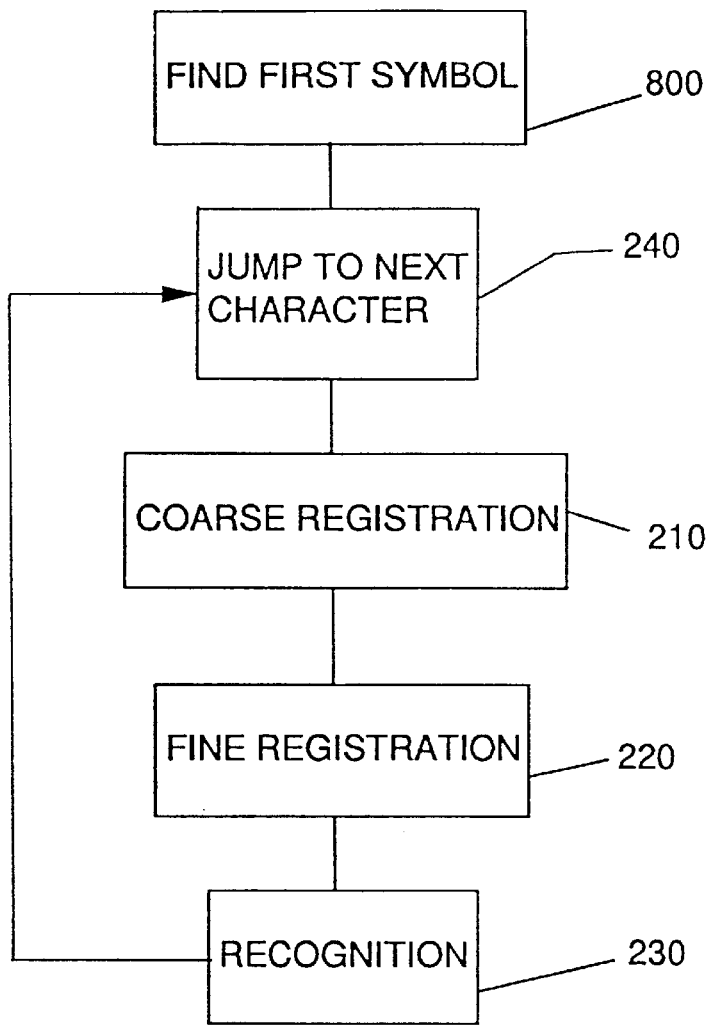
FIG. 8 is a flow diagram illustrating the general process for reading the machine readable code.

Image/code converter 210 contains OCR logic which operates according to the general process illustrated in FIG. 8.

Figure 9:
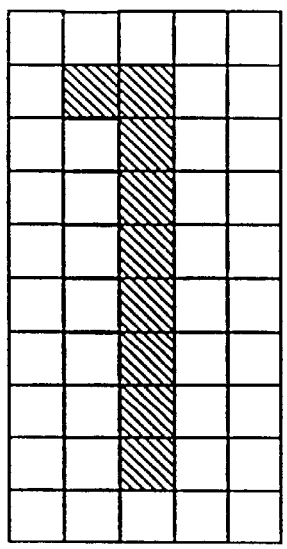
FIG. 9 shows a template used in image registration.

In step 800, the first symbol is located in the top left hand corner of the image. To ease location of this first symbol, the code is preferably defined such that the first symbol on each page is totally black. This symbol can therefore be easily located via a registration process in the vicinity of the expected position using a template defined as a frame of 2 white pixels around the character that represents the sequence (1,0,0,0,0,0,0,0,0,0,0,0,0,0,0,0) as shown in FIG. 9, ie the portion which is common to all characters in the sequence. As before, each square on FIG. 9 represents a block of 2×2 pixels. The use of correlation to locate image features is a well known standard technique and need not be described in any great detail here. Essentially, the technique involves displacing the image in each direction by a predefined number of pixels to find the best match with a predefined template.

A jump is then made—step 240—to the expected position of the next character using the known nominal spacing of the characters. The image of the next symbol is aligned in step 210 by a coarse correlation process with the same predefined template defined as a frame of 2 white pixels around a rectangle of 6×16 black pixels.

Once the approximate position of the character is known, an attempt can be made to decode the character. The result of this decoding is used to define a better template, ie the proper shape of the character resulting from this initial decoding. This second template is used as a basis for a finer registration process in step 220.

Once the coarse and fine registration steps are complete and the optimal match between the character and the second template has been found, the character is recognized in step 230.

Recognition is done in two steps. First, an initial guess of each of the 16 elements that are represented by a symbol. This is done by separately evaluating the 8 rows comprising a symbol. Each row is decoded by determining the starting and ending position of a run of black pixels within the row with respect to the starting point of a run of black pixels in the first row. Recall that the top left hand element of the symbol is always black and so this position can be used to define the edge of the symbol. The second step is to take the initial guess and correct it if necessary up to a change of one element according to the error correcting scheme described above. The result is the recognition of the current symbol.

The process is then repeated until all the characters on the page have been decoded.

It will be appreciated that the above described approach is simpler to implement than conventional optical character recognition. Recognition is carried out according to a rule and the location of the characters is more robust under stretching skewing and twisting.

INDUSTRIAL APPLICABILITY

The invention is industrially applicable in the field of telecommunications and data processing.

I claim:

1. A recording apparatus adapted for connection to a telephone network and to receive voice signals therefrom, comprising:
   a predefined code, comprising a character set in which each character in the set corresponds to a predefined bit sequence in digital data to be encoded, wherein in the predefined code:
   each of the characters is represented using a plurality of pixels, wherein the pixels making up each character are contiguous;

each character contain no holes; and a first dimension of each character in a first direction perpendicular to a row of detectors is greater than a second dimension of the character in a second direction parallel to the row of detectors;

an encoder for converting voice signals received from the telephone network into an optically readable image using the predefined code; and a printer for printing the optically readable image.

2. The recording apparatus as claimed in claim 1, wherein each of the characters comprises a series of rectangles spaced in the first direction, wherein a width and/or a position in the second direction of each of the rectangles is determined by a bit pair in the bit sequence to be encoded by the character.

3. The recording apparatus as claimed in claim 1 wherein the bit sequence corresponding to each character includes an error correcting code.

4. The recording apparatus as claimed in claim 1 wherein each character includes a portion which is common to all characters.

5. The recording apparatus as claimed in claim 1, further comprising a playback apparatus, the playback apparatus comprising:

an optical scanner for producing a digital representation of a document on which is printed the optically readable image;

a decoder for converting the optically readable image into audio signals using the predefined code; and a transducer for producing a sound corresponding to the audio signals.

6. The recording apparatus as claimed in claim 5, wherein each of the characters comprises a series of rectangles spaced in the first direction, wherein a width and/or a position in the second direction of each of the rectangles is determined by a bit pair in the bit sequence to be encoded by the character.

7. The recording apparatus as claimed in claim 5 wherein the bit sequence corresponding to each character includes an error correcting code.

8. The recording apparatus as claimed in claim 6 wherein each character includes a portion which is common to all characters.

9. A playback apparatus, comprising:

a predefined code, comprising a character set in which each character in the set corresponds to a predefined bit sequence in digital data to be encoded, wherein in the predefined code:

each of the characters is represented using a plurality of pixels, wherein the pixels making up each character are contiguous;

each character contains no holes; and a first dimension of each character in a first direction perpendicular to a row of detectors is greater than a second dimension of the character in a second direction parallel to the row of detectors;

an optical scanner for producing a digital representation of a document on which is printed an optically readable image;

a decoder for converting the optically readable image into audio signals using the predefined code; and a transducer for producing a sound corresponding to the audio signals.

10. The playback apparatus as claimed in claim 9, wherein each of the characters comprises a series of rectangles spaced in the first direction, wherein a width and/or a position in the second direction of each of the rectangles is determined by a bit pair in the bit sequence to be encoded by the character.

11. The playback apparatus as claimed in claim 9 wherein the bit sequence corresponding to each character includes an error correcting code.

12. The playback apparatus as claimed in claim 9 wherein each character includes a portion which is common to all characters.

13. A device adapted for connection between a fax machine and a telephone network to form, in combination with the fax machine, a recording apparatus, the recording apparatus comprising:

a predefined code, comprising a character set in which each character in the set corresponds to a predefined bit sequence in digital data to be encoded, wherein in the predefined code:

each of the characters is represented using a plurality of pixels, wherein the pixels making up each character are contiguous;

each character contains no holes; and a first dimension of each character in a first direction perpendicular to a row of detectors is greater than a second dimension of the character in a second direction parallel to the row of detectors;

an encoder for converting voice signals received from the telephone network into an optically readable image using the predefined code;

a printer for printing the optically readable image; and a playback apparatus, comprising:

an optical scanner for producing a digital representation of a document on which is printed the optically readable image;

a decoder for converting the optically readable image into audio signals using the predefined code; and a transducer for producing a sound corresponding to the audio signals.

14. The device as claimed in claim 13, wherein each of the characters comprises a series of rectangles spaced in the first direction, wherein a width and/or a position in the second direction of each of the rectangles is determined by a bit pair in the bit sequence to be encoded by the character.

15. The device as claimed in claim 13 wherein the bit sequence corresponding to each character includes an error correcting code.

16. The device as claimed in claim 13 wherein each character includes a portion which is common to all characters.

* * * * *